(12) United States Patent
Bollinger, Jr. et al.

(10) Patent No.: US 8,280,209 B2
(45) Date of Patent: Oct. 2, 2012

(54) CABLE CONDUITS HAVING RIPCORDS FOR LONGITUDINALLY SLITTING THE CONDUIT AND RELATED METHODS

(75) Inventors: George W. Bollinger, Jr., Claremont, NC (US); Christopher Paul Gemme, Hickory, NC (US)

(73) Assignee: CommScope, Inc., Hickory, NC (US)

( * ) Notice: Subject to any disclaimer, the term of this patent is extended or adjusted under 35 U.S.C. 154(b) by 420 days.

(21) Appl. No.: 12/549,527

(22) Filed: Aug. 28, 2009

(65) Prior Publication Data
US 2011/0052127 A1  Mar. 3, 2011

(51) Int. Cl.
*G02B 6/44* (2006.01)

(52) U.S. Cl. ....................................... 385/106

(58) Field of Classification Search .................. 385/106
See application file for complete search history.

(56) References Cited

U.S. PATENT DOCUMENTS

| | | | |
|---|---|---|---|
| 3,748,371 A * | 7/1973 | Krook et al. ................. 174/70 R |
| 4,707,074 A * | 11/1987 | Heywood ...................... 385/113 |
| 5,039,196 A | 8/1991 | Nilsson |
| 5,719,353 A | 2/1998 | Carlson et al. |
| 6,167,178 A | 12/2000 | Nave |
| 6,205,277 B1 | 3/2001 | Mathis et al. |
| 6,445,859 B1 | 9/2002 | Witt |
| 6,545,222 B2 * | 4/2003 | Yokokawa et al. ....... 174/110 R |
| 6,681,071 B2 | 1/2004 | Newton et al. |
| 6,701,047 B1 | 3/2004 | Rutterman et al. |
| 6,704,481 B2 * | 3/2004 | Gaillard et al. .............. 385/113 |
| 6,901,191 B2 * | 5/2005 | Hurley et al. ................. 385/109 |
| 7,006,739 B2 | 2/2006 | Elkins, II et al. |
| 7,016,592 B2 | 3/2006 | Elkins, II et al. |
| 7,027,697 B2 | 4/2006 | Tatarka et al. |
| 7,085,455 B2 | 8/2006 | Morris |
| 7,088,893 B2 | 8/2006 | Cooke et al. |
| 7,113,680 B2 | 9/2006 | Hurley et al. |
| 7,127,143 B2 | 10/2006 | Elkins, II et al. |
| 7,184,633 B2 | 2/2007 | Cooke et al. |
| 7,197,214 B2 | 3/2007 | Elkins, II et al. |
| 7,207,208 B2 | 4/2007 | Sutehall |
| 7,266,274 B2 | 9/2007 | Elkins, II et al. |
| 7,279,643 B2 * | 10/2007 | Morrow et al. ............... 174/481 |
| 7,327,943 B2 | 2/2008 | Vo et al. |
| 7,361,835 B2 | 4/2008 | Morrow et al. |
| 7,391,943 B2 * | 6/2008 | Blazer et al. ................. 385/100 |
| 7,447,406 B2 | 11/2008 | Sutehall et al. |

(Continued)

FOREIGN PATENT DOCUMENTS

JP 2007-127887 * 3/2007

*Primary Examiner* — Charlie Peng
(74) *Attorney, Agent, or Firm* — Myers Bigel Sibley & Sajovec

(57) ABSTRACT

Cable conduits include an elongated tubular conduit body having an exterior surface and an interior surface that define a tube wall, the interior surface of the tubular body defining a longitudinal internal cavity that is configured to hold a plurality of jacketed cables. The conduits also have first and second longitudinally extending channels within the tube wall. A first ripcord is free-floating within at least a portion of the first longitudinally extending channel and a second ripcord is free-floating within at least a portion of the second longitudinally extending channel. The first and second longitudinally extending channels are located on opposite sides of the longitudinal internal cavity. Related methods of slitting such cable conduits are also provided.

20 Claims, 13 Drawing Sheets

U.S. PATENT DOCUMENTS

| | | |
|---|---|---|
| 7,450,804 B2 | 11/2008 | Elkins, II et al. |
| 2001/0029814 A1* | 10/2001 | Tiano .............................. 81/119 |
| 2003/0118295 A1* | 6/2003 | Lail et al. ...................... 385/101 |
| 2005/0036750 A1* | 2/2005 | Triplett et al. ................. 385/100 |
| 2009/0324182 A1* | 12/2009 | Kachmar et al. ............... 385/104 |
| 2011/0286706 A1* | 11/2011 | Greenwood et al. .......... 385/107 |

* cited by examiner

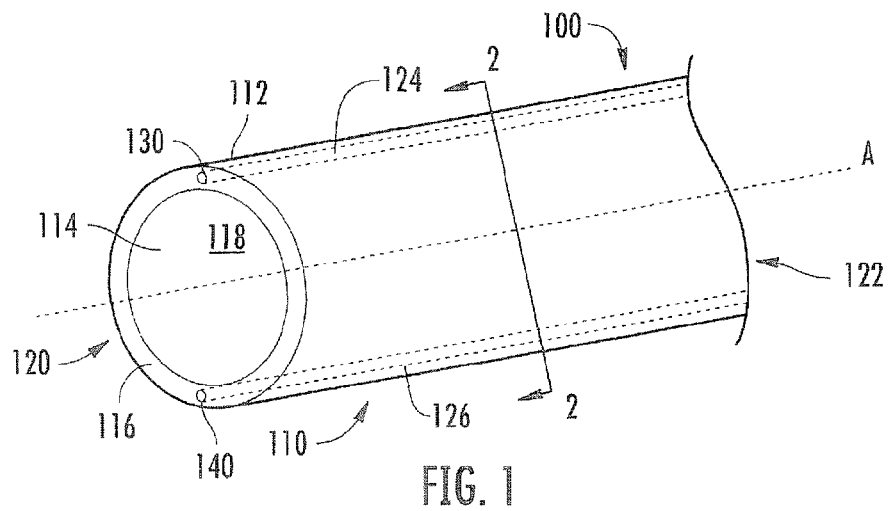
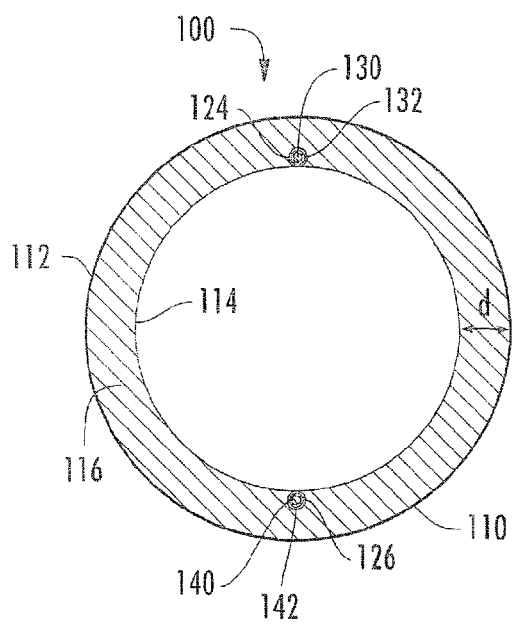
FIG. 2
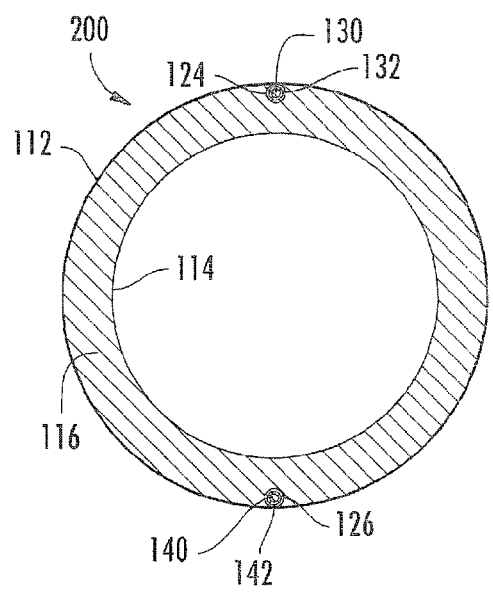
FIG. 3

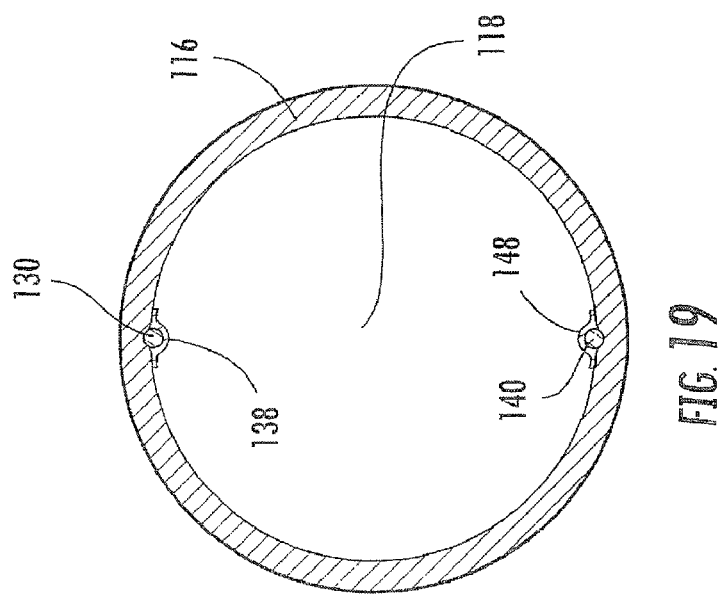
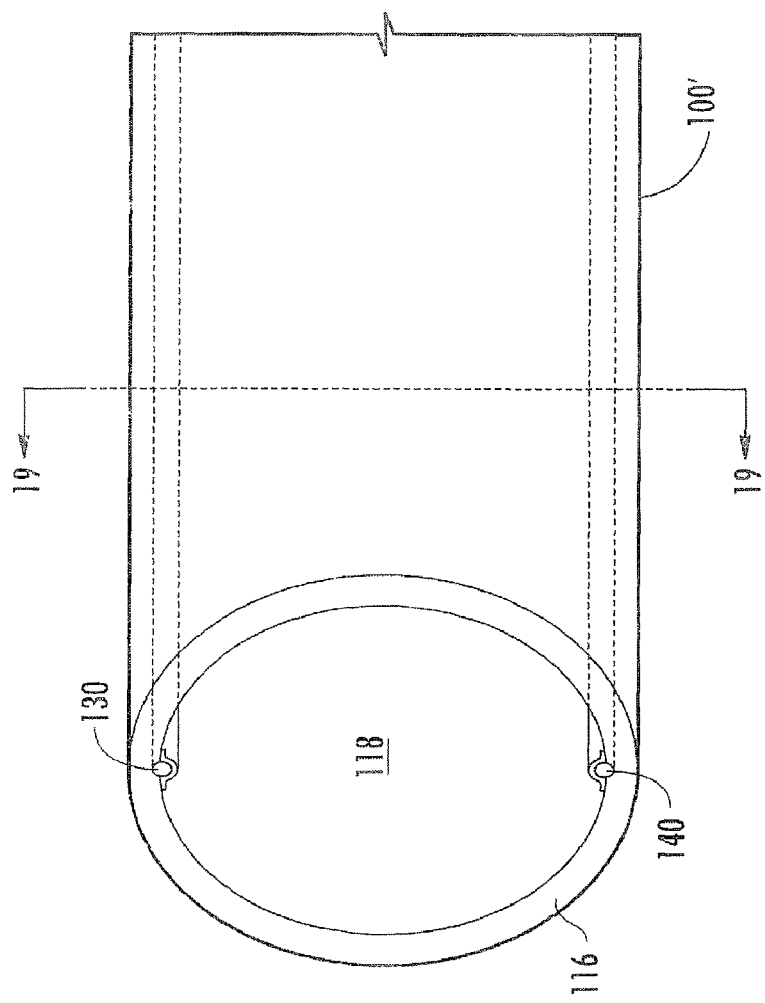

CABLE CONDUITS HAVING RIPCORDS FOR LONGITUDINALLY SLITTING THE CONDUIT AND RELATED METHODS

FIELD OF THE INVENTION

The present invention relates to conduits and, more particularly, to conduits for cables, and to methods of slitting such conduits and installing cables therein.

BACKGROUND

Many electrical and/or telecommunications cables (e.g., fiber optic cables, coaxial cables, copper twisted pair cables, etc.) are run underground or through the walls and floors/ceilings of buildings. In order to protect these cables from moisture, water damage, corrosion, rodents and the like and/or to route the cables in an organized fashion, the cables are often enclosed in protective hollow tubes that are typically referred to as "cable conduits" or simply as "conduits." In addition to environmental protection and cable organization, cable conduits may also serve other functions such as, for example, providing flame retardancy (e.g., for cables that run through the walls, floors and/or ceilings of residences and commercial buildings).

Typically, cable conduits are formed from one or more lengths of polyethylene or polyvinylchloride tubing or other plastic tubing that is connected (if multiple lengths of conduit are used) and laid in the ground or positioned in the building where the cables are to be routed. The cables are typically installed in the cable conduit by pulling each cable through the conduit. For example, one end of a rope may be blown through the conduit, while the other end of the rope is attached to one of the cables. By pulling on the end of the rope that is blown through the conduit, the cable may be drawn through the conduit. In some cases, the cable(s) can be pre-installed in the conduit at, for example, the factory where the conduit is manufactured. Once in place within the conduit, the cable is protected from damage which may be caused by weather, moisture and other hazards.

In many instances, it is necessary to break open a conduit in order to gain access to one or more of the cables inside the conduit to, for example, connect the cable to another cable or to a piece of equipment. In some instances, access to as much as fifty feet or more of a cable may be necessary (e.g., for creating a slack loop). In order to expose such a length of cable, the conduit is typically cut using a cutting tool along its transverse direction, and then a conduit slitting tool such as, for example, a Cable Sheath Slitter (part number 10923) available from CommScope, Inc., the assignee of the present application, is used to make two longitudinal slits in the conduit to expose the cables running therein. The conduit may be transversely cut a second time at the far end of the slits in order to completely remove the slit portion of the conduit. This second cut may be made before or after the slits are cut.

While these methods of breaking open conduits are effective, they can be time consuming and/or tiring for installers to accomplish.

SUMMARY

Pursuant to embodiments of the present invention, cable conduits are provided that include an elongated tubular conduit body having an exterior surface and an interior surface that define a tube wall. The interior surface of the tubular body defines a longitudinal internal cavity that is configured to hold a plurality of jacketed cables. The cable conduit further includes first and second longitudinally extending channels within the tube wall. First and second ripcords are free-floating within at least a portion of the respective first and second longitudinally extending channels. The first and second longitudinally extending channels are located on opposite sides of the longitudinal internal cavity.

In some embodiments, the elongated tubular body may be a high density polyethylene tubular body. Moreover, the elongated tubular body may have a circular cross-section to form an open-ended cylindrical body, and the first and second ripcords may be located approximately 180 degrees apart within this cylindrical body. The internal cavity may be free of any support ribs. The first and second ripcords may be located substantially adjacent to the inner surface of the elongated tubular body. The first and second ripcords may each be coated with a coating that prevents the first and second ripcords from adhering to the elongated tubular body. The diameter of each of the first and second ripcords are each less than half the thickness of the tube wall. First and second fiber optic cables may be provided in the longitudinal internal cavity, each of which may include an outer housing and at least two buffer tubes that contain a plurality of fibers within the respective outer housings. The first fiber optic cable may include a jacket ripcord within the outer housing.

Pursuant to further embodiments of the present invention, methods of longitudinally slitting a cable conduit are provided. The cable conduit may include an elongated tubular conduit body having an exterior surface and an interior surface that define a tube wall, a first ripcord that is free-floating within a first longitudinally extending channel in the tube wall, a second ripcord that is free-floating within a second longitudinally extending channel in the tube wall and a longitudinal internal cavity that is defined by the interior surface of the tubular conduit body. Pursuant to these methods the conduit body, the first ripcord and the second ripcord are cut to separate each of the conduit body, the first ripcord and the second ripcord into respective first and second subsections. An end portion of the first subsection of the first ripcord is grasped. The end portion of the first subsection of the first ripcord is pulled back along a portion of the length of the first conduit body subsection to form a first longitudinal slit in the first conduit body subsection. An end portion of the first subsection of the second ripcord is grasped. The end portion of the first subsection of the second ripcord back is pulled along a portion of the length of the first conduit body subsection to form a second longitudinal slit in the first conduit body subsection.

In some embodiments of these methods, the first conduit body subsection may be a cylindrical body having a longitudinally extending internal cavity, and the first and second longitudinal slits may be spaced apart on the cylindrical body by approximately 180 degrees. The first and second slits may each be partial slits that do not extend all the way through the cylindrical body to expose the longitudinally extending internal cavity. The method may further include inserting the first subsection of the first ripcord into the second longitudinal slit and pulling the first subsection of the first ripcord back along a portion of the length of the first conduit body subsection so that the first subsection of the first ripcord extends the length of the second longitudinal slit. The method may also include inserting the first subsection of the second ripcord into the first longitudinal slit, and pulling the first subsection of the second ripcord back along a portion of the length of the first conduit body subsection so that the first subsection of the second ripcord extends the length of the first longitudinal slit.

In some embodiments, the first subsection of the first ripcord is pulled back along a portion of the length of the first conduit body subsection so that the first subsection of the first ripcord extends the length of the second longitudinal slit at the same time that the first subsection of the second ripcord is pulled back along a portion of the length of the first conduit body subsection so that the first subsection of the second ripcord extends the length of the first longitudinal slit. In some embodiments, the first conduit body subsection and the first subsection of the first ripcord and the first subsection of the second ripcord may be cut, and then the portion of the first conduit body subsection that is between the location of the cut and the second conduit body subsection may be removed.

Pursuant to further embodiments of the present invention, methods of accessing a plurality of cables in a cable conduit are provided. Pursuant to these methods, a cable conduit is unrolled from a reel. The cable conduit may comprise any of the cable conduits according to embodiments of the present invention that are described herein. The cable conduit may include cables that are pre-installed with cables at the factory. In other embodiments, the cables may be installed within the cable conduit in the field. For example, in some embodiments, the cable conduit may comprise a high density polyethylene elongated tubular conduit body having exterior and interior surfaces that define a tube wall, where the interior surface of the tubular body defines a longitudinal internal cavity that is configured to hold a plurality of jacketed cables. The cable conduit may include first and second longitudinally extending channels within the tube wall that are located on opposite sides of the internal cavity. First and second free-floating ripcords are provided in the respective first and second longitudinally extending channels. The elongated conduit body and the first and second ripcords are then cut. Finally, the first and second ripcords are used to slit the conduit adjacent the cut in the elongated conduit body to expose a section of each of the plurality of cables.

In some embodiments, the first and second ripcords may be used to slit the conduit by pulling the end portion of the first subsection of the first ripcord back along a portion of the length of the first conduit body subsection to form a first longitudinal slit in the first conduit body subsection and pulling the end portion of the first subsection of the second ripcord back along a portion of the length of the first conduit body subsection to form a second longitudinal slit in the first conduit body subsection. The first subsection of the first ripcord may then be inserted into the second longitudinal slit, and pulled back along a portion of the length of the first conduit body subsection so that the first subsection of the first ripcord is used to extend the length of the second longitudinal slit.

BRIEF DESCRIPTION OF THE FIGURES

The accompanying drawings, which are included to provide a further understanding of the invention and are incorporated in and constitute a part of this application, illustrate certain embodiment(s) of the invention. In the drawings:

FIG. 1 is a perspective view of a cable conduit according to certain embodiments of the present invention.

FIG. 2 is a transverse cross-sectional view of the cable conduit of FIG. 1 taken along the line 2-2 of FIG. 1.

FIG. 3 is a transverse cross-sectional view of a cable conduit according to further embodiments of the present invention.

FIG. 18 is a perspective view of a cable conduit according to further embodiments of the present invention.

FIG. 19 is a transverse cross-sectional view of the cable conduit of FIG. 18 taken along the line 19-19 of FIG. 18.

DETAILED DESCRIPTION

Figure 4:
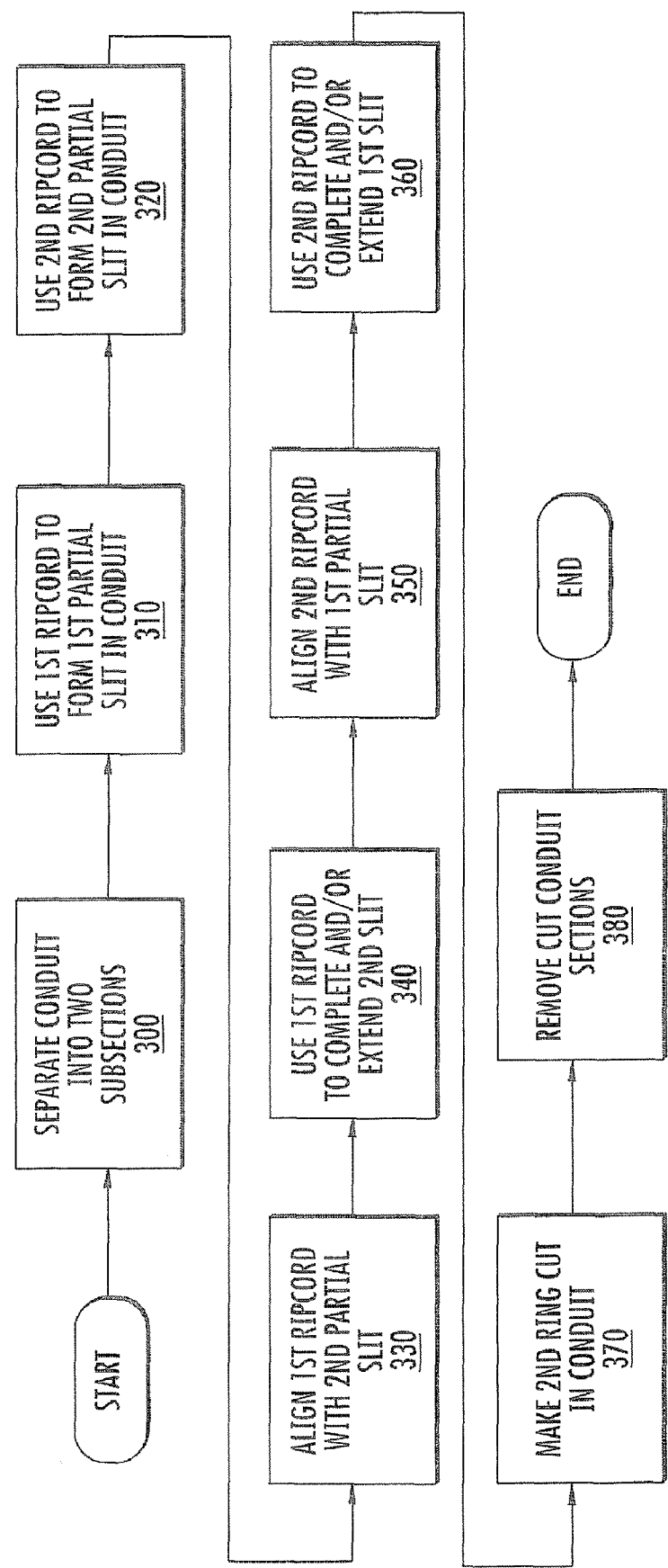
FIG. 4 is a flow chart illustrating methods of slitting a cable conduit according to certain embodiments of the present invention.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" or "attached" or "coupled" to another element, it can be directly on or attached or coupled to the other element or intervening elements may also be present. In contrast, when an element is referred to as being "directly on" or "directly attached" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

Embodiments of the invention are described herein with reference to perspective and cross-section diagrams that are schematic illustrations of idealized embodiments (and intermediate structures). Thus, it will be understood that the thickness of layers and regions in the drawings may be exaggerated for clarity. Additionally, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" specify the presence of stated features, operations, elements, and/or components, but do not preclude the presence or addition of one or more other features, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this disclosure and the relevant art and will not be interpreted in an idealized or overly formal sense unless expressly so defined herein.

Embodiments of the present invention are directed to elongated cable conduits that may be used to carry telecommunications cables, electrical cables and the like in an internal cavity so as to protect and/or organize the cables. Additional embodiments of the present invention are directed to related methods of slitting such conduits to expose the cables contained therein. As used herein, the term "conduit" refers to a protective housing that is configured to hold one or more cables (including cables that have multiple conductors or optical fibers) that an end user or installer may pull through the conduit. A conduit differs from a jacket or other protective coating or layer that may be applied to, for example, a telecommunications or electrical cable, in that the conductors or optical fibers with the jacket or outer layer of a telecommunications or electrical cable will have a fixed relationship, whereas the cables in a conduit do not (and, in fact, most typically, the cables are installed within the conduit in the field). As used herein, the term "longitudinal" and derivatives thereof refer to the direction defined by the central axis of the internal cavity of a cable conduit when the conduit is extended in a straight line. The term "transverse" and derivatives thereof refer to the plane that is normal to the longitudinal direction.

Pursuant to embodiments of the present invention, cable conduits are provided that have first and second ripcords embedded therein that may be used to cut longitudinal slits in a portion of the conduit to, for example, provide access to one or more of the cables contained therein. The cable conduits according to embodiments of the present invention may each comprise an elongated tubular conduit body that has an exterior surface and an interior surface that define a longitudinally extending tube wall. The interior surface of the tube wall may define a channel that carries the cables. First and second longitudinally extending channels may be provided in the tube wall. The first and second ripcords may reside in the first and second longitudinally extending channels, respectively, so as to extend along the length of the conduit. Each ripcord may be "free-floating" within its respective channel. The first and second ripcords may be positioned opposite each other (e.g., for a circular tube wall, the ripcords may be separated by about 180 degrees). Each ripcord may be used to partially or fully slit through the tube all of the conduit to provide access to cables within the conduit.

FIG. 1 is a perspective view of a cable conduit 100 according to certain embodiments of the present invention. FIG. 2 is a transverse cross-sectional view of the cable conduit 100 taken along the line 2-2 of FIG. 1.

As shown in FIGS. 1 and 2, the cable conduit 100 comprises an elongated, tubular body 110 that has an exterior surface 112 and an interior surface 114 that together define a tube wall 116. The interior surface 114 of the tube wall 116 defines a longitudinal internal cavity 118 that is configured to hold one or more cables. The interior surface 114 may, in some embodiments, comprise a smooth surface that may facilitate running cables through the cavity 118. The elongated, tubular body 110 may comprise, for example, any suitable polymeric (i.e. plastic) material such as polyethylene or polyvinylchloride. In some embodiments, the tubular body 110 is formed of high density polyethylene ("HDPE").

The tubular wall 116 may, in some embodiments, have a thickness "d" (see FIG. 2) of between about 0.05 inches to about 0.75 inches. Moreover, the tubular body 110 may have a diameter of, for example, from about 0.5 inches to about 6.5 inches (for embodiments of the present invention that have a circular cross-section). The tubular body 110 may have first and second end portions 120, 122. These first and second end portions 120, 122 may be open. While shown in FIGS. 1 and 2 as having a constant thickness, in some embodiments, the first and second end portions 120, 122 of the tubular body 110 may have a reduced or increased diameter exterior (for a tube with a circular cross-section) so that two lengths of conduit 100 may be readily connected without use of a special connector piece.

While the conduit 100 depicted in FIGS. 1 and 2 has a circular cross-section, it will be appreciated that the conduits according to embodiments of the present invention may have other cross-sectional shapes such as, for example, square, rectangular, pentagonal, hexagonal, octagonal or other cross-sectional shapes.

First and second longitudinally extending channels 124, 126 are provided within the tube wall 110. A first ripcord 130 is disposed in the first longitudinally extending channel 124, and a second ripcord 140 is disposed in the second longitudinally extending channel 126. The first and second longitudinally extending channels 124, 126 (and the first and second ripcords 130, 140 disposed therein) extend along the length of the conduit 100 and, in some embodiments, extend in substantially straight lines that are parallel to a central longitudinal axis "A" of the elongate tubular body 110. The first and second longitudinally extending channels 124, 126 (and the first and second ripcords 130, 140 disposed therein) may run continuously along the entire length of the elongate tubular body 110.

The first and second ripcords 130 may comprise metal wires or non-metallic material. For example, in some embodiments, the ripcords 130, 140 may comprise steel, copper, copper-clad steel, copper-clad aluminum or tin-clad copper wires. In other embodiments, the ripcords 130, 140 may comprise Kevlar®, polyester or polypropylene strings. The ripcords 130, 140 may also be formed of other materials. The ripcords 130, 140 should be sufficiently strong that, when grasped, they may be used to rip through the tubular body 110 to create at least a partial slit in the tube wall 116 (i.e., a slit that goes part way through the tube wall 116, but does not go completely through the tube wall 116 to expose the internal cavity 118).

The first and second ripcords 130, 140 may possess sufficient elongation to allow the ripcords to be torn out through the exterior surface 112 of the elongate tubular body 110. For example, in some embodiments, the ripcords 130, 140 may have an elongation of at least about 1% and, in certain specific embodiments, may have an elongation of at least about as measured according to ASTM methods B3 and B869.

As shown best in FIG. 2, in some embodiments the first ripcord 130 may be located on a first side of the internal cavity 118 and the second ripcord 140 may be located on the other side of the internal cavity 118 substantially opposite the first ripcord 130. For example, in conduits according to embodiments of the present invention in which the tubular body 110 has a circular cross-section to form an open-ended cylindrical body, the first and second ripcords 130, 140 may be located approximately 180 degrees apart within the cylindrical body.

In some embodiments, the first and second ripcords 130, 140 may be coated with a layer 132, 142, respectively, of a coating composition. The coating composition layers 132, 142 may have a thickness of, for example, from about 1 to about 15 mils. In some embodiments, the thickness of the coating layer may be about 8 mils. The coating composition layers 132, 142 may be formed of a material that prevents the ripcords 130, 140 from adhering to a polymer melt that may be used to form the elongated tubular body 110. Accordingly, the coating composition layers 132, 142 are typically formed of a polymeric material that has a melting temperature above the temperature of the polymeric melt so that is does not melt during the formation of the elongated tubular body 110. In some embodiments, the coating composition layers 132, 142 may be formed of fluoropolymers (e.g. polytetrafluoroethylene (PTFE), fluorinated ethylene-propylene (FEP), ethylenetrifluoroethylene (ETFE), and ethylenechlorotrifluoroethylene (ECTFE), polyvinyl fluoride (PVF) and polyvinylidene fluoride (PVDF)); polyamides (e.g. nylon); polyesters (e.g. polyethylene terephthalate (PET)); polycarbonates; polypropylene; polyurethanes; polyacetals; polyacrylics; epoxies; silicone polymers; and mixtures thereof. The high melting temperature polymeric materials used in the coating may, for example, have a melting temperature of at least about 500 degrees Fahrenheit. The coating compositions 132, 142 may also provide corrosion resistance to the ripcords 130, 140 which may be advantageous, for example, when one of the ripcords 130, 140 is also used to carry a toning signal, as is discussed in more detail herein.

In some embodiments, a diameter of each of the first ripcord 130 and the second rip cord 140 may be less than half the thickness of the wall of the tubular body 110. In certain embodiments, the diameter of each of the first ripcord 130 and the second rip cord 140 may be less than one third the thickness of the wall of the tubular body 110. In some embodiments, the first and second ripcords 130, 140 each has a diameter of from 0.32 mm (28 gauge) to 2.59 mm (10 gauge).

As shown in FIGS. 1 and 2, the first and/or second ripcords 130, 140 may be located adjacent the interior surface 114 of the elongated, tubular body 110. This may facilitate practicing certain methods of slitting a conduit according to embodiments of the present invention, as will be discussed herein.

FIG. 3 is a transverse cross-sectional view of a cable conduit 200 according to further embodiments of the present invention. As shown in FIG. 3, the conduit 200 may be identical to the conduit 100 described above, except for the location of the first and second longitudinally extending channels 124, 126 (and the first and second ripcords 130, 140 that are disposed therein) within the tubular body 110. In particular, as shown in FIG. 3, in the conduit 200 the first and second longitudinally extending channels 124, 126 (and the first and second ripcords 130, 140 that are disposed therein) are each located adjacent the exterior surface 112 of the tubular body 110. This may facilitate practicing methods of slitting a conduit according to other embodiments of the present invention, as will also be discussed herein.

While in some embodiments the first and second ripcords 130, 140 are fully embedded within the tubular body 110 (such as cable conduits 100 and 200 discussed above), in other embodiments the first and/or second ripcords 130, 140 may only be partly embedded within the tubular body 110. FIGS. 18 and 19 are a perspective view and a transverse cross-sectional view, respectively, of a cable conduit 250 according to still further embodiments of the present invention that includes partially embedded ripcords. As shown in FIGS. 18 and 19, the conduit 250 may be identical to the conduit 100 described above with respect to FIGS. 1 and 2, except that the ripcords 130, 140 are located such that they are each only about halfway embedded in the tube wall 116, with the remainder of each ripcord 130, 140 being located in the internal cavity 118. A thin film of polymeric material 138, 148 may be provided on the portions of ripcords 130, 140, respectively that would otherwise be exposed to the internal cavity 118 in order to form the longitudinally extending channels 124, 126. The inclusion of these thin films 138, 148 of polymeric material (which may be the same material that is used to form the tube wall 116) may act to hold the ripcords 130, 140 in place such that the ripcords are kept separate from cables that are carried by the internal cavity 118 (and hence will not become tangled with such cables when the conduit 250 is used). By locating the ripcords 130, 140 so that they extend into the internal cavity 118 (or, in other embodiments, so that the ripcords 130, 140 are located in the tube wall just outside the internal cavity 118 so as to be separated from the internal cavity 118 by a very thin web of material), the ripcords 130, 140 can be used to form a slit that either extends all the way through the tube wall 116 or extends so close to all the way through the tube wall 116 that manipulation of the conduit 250 by hand is sufficient to complete the slit. In this manner, the ripcords 130, 140 may each be used to form a complete slit in the conduit without any need for a separate cutting operation.

FIG. 4 is a flow chart illustrating methods of slitting a cable conduit according to certain embodiments of the present invention. FIGS. 5-10 are perspective views of the cable conduit 100 of FIGS. 1 and 2 at selected stages as the conduit is being slit according to the method illustrated in the flow chart of FIG. 4.

Figure 5:
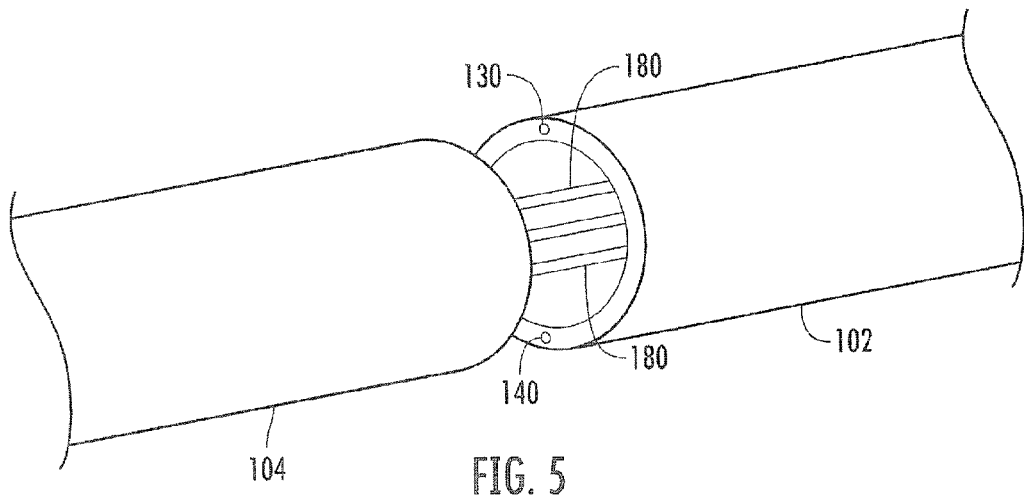
FIG. 5 is a perspective view of a cable conduit according to certain embodiments of the present invention after it has been cut into first and second longitudinally extending sections.

As shown in FIG. 4, operations may begin with a technician separating the conduit 100 into first and second longitudinally extending conduit subsections (block 300). This may be accomplished, for example, by using a conduit cutter to cut through the conduit 100 in a direction normal to the longitudinal axis of the conduit 100 (which is often referred to as a "ring cut"). The conduit cutter may be used to ring cut the conduit 100 without cutting the cables 180 that are carried inside an internal cavity 118 of the conduit 100. This ring cut of the conduit 100 also cuts the first ripcord 130 into first and second pieces and cuts the second ripcord 140 into first and second pieces. FIG. 5 illustrates the appearance of the conduit 100 after the operations of block 300 are performed.

Figure 6:
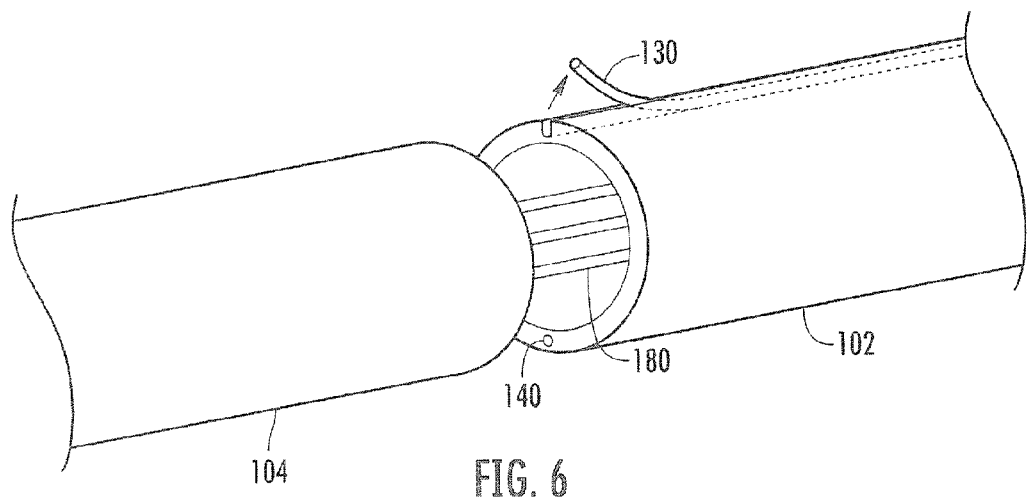
FIG. 6 is a perspective view of the cable conduit of FIG. 5 after a first ripcord embedded therein has been used to partially form a first portion of a first longitudinal slit in the first longitudinally extending section.

As shown in the flow chart of FIG. 4, the technician can then grasp the exposed end of the first piece of the first ripcord 130 (e.g., using a pair of pliers or the like) and may then pull the exposed end of the first piece of the first ripcord back 130 along the longitudinal length of the first longitudinally extending conduit body subsection 102 (block 310). In this manner, the first piece of the first ripcord 130 may be used to partially slit the conduit 100. The operations of block 310 are depicted graphically in FIG. 6. As shown in FIG. 6, as the first ripcord 130 is pulled back along the longitudinal length of the first longitudinally extending conduit subsection 102, it tears a first slit 150 in the conduit 100 that extends from the exterior edge of the first longitudinally extending channel 124 to the exterior surface 112 of the conduit 100. As shown in FIG. 6, the first slit 150 may not extend all the way through to the internal channel 118, as the first ripcord 130 is not pulled in a direction whereby it could cut through the portion of the tube wall 116 between the interior edge of the first longitudinally extending channel 124 and the interior surface 114 of the conduit 100. The first slit 150 can extend for only a very small portion of the longitudinal length of the conduit 100, or can be longer, if desired.

Figure 7:
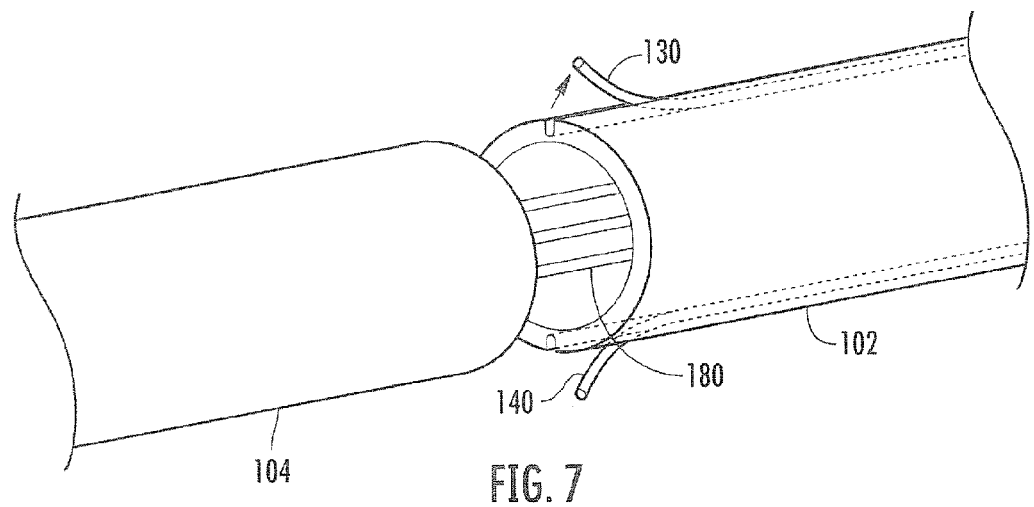
FIG. 7 is a perspective view of the cable conduit of FIG. 6 after a second ripcord embedded therein has been used to partially form a first portion of a second longitudinal slit in the first longitudinally extending section.

Next, the technician can grasp the exposed end of the first piece of the second ripcord 140 (e.g., using a pair of pliers or the like) and then pull the exposed end of the first piece of the second ripcord 140 back along the longitudinal length of the first longitudinally extending conduit subsection 102 (block 320). In this manner, the first piece of the second ripcord 140 may be used to partially slit the conduit 100. The operations of block 320 are depicted graphically in FIG. 7. As shown in FIG. 7, as the second ripcord 140 is pulled back along the longitudinal length of the first longitudinally extending conduit subsection 102, it tears a second slit 160 in the conduit 100 that extends from the exterior edge of the second longitudinally extending channel 126 to the exterior surface 112 of the conduit 100. The second slit 160 may not extend all the way through to the internal channel 118, as the second ripcord 140 is not pulled in a direction whereby it could cut through the portion of the tube wall 116 between the interior edge of the second longitudinally extending channel 126 and the interior surface 114 of the conduit 100. The second slit 160 can extend for only a very small portion of the longitudinal length of the conduit 100, or can be longer, if desired.

Next, the technician can grasp the exposed end of the first piece of the first ripcord 130 (e.g., using a pair of pliers or the like) and place it so that it is aligned in the second slit 160 (block 330). To accomplish this, the technician may pull the first ripcord 130 across the open internal cavity 118, thereby cutting through the remaining material of the tube wall 116 in the initial portion of the first slit 150 to complete the initial portion of the first slit 150. The technician may then continue to pull the exposed end of the first piece of the first ripcord 130 through the second slit 160 back along the longitudinal length of the first longitudinally extending conduit subsection 102 (block 340), which will act to continue to cut through the remaining material of the tube wall 116 in the first slit 150 while simultaneously cutting through the remaining material of the tube wall 116 in the second slit 160. Thus, in this fashion, the technician can complete the first and second slits 150, 160 so that each slit exposes the internal cavity 118, and at the same time the technician can extend the first and second slits 150, 160 to a desired longitudinal length.

Optionally, the technician can also grasp the exposed end of the first piece of the second ripcord 140 (e.g., using a pair of pliers or the like) and place it so that it is aligned in the first slit 150 (block 350). To accomplish this, the technician may pull the second ripcord 140 across the open internal cavity 118, thereby cutting through the remaining material of the tube wall 116 in the initial portion of the second slit 160 to complete the initial portion of the second slit 160. The technician may then continue to pull the exposed end of the first piece of the second ripcord 140 through the first slit 150 back along the longitudinal length of the first longitudinally extending conduit subsection 102 (block 360), which will act to continue to cut through the remaining material of the tube wall 116 in the second slit 160 while simultaneously cutting through the remaining material of the tube wall 116 in the first slit 150. When the technician simultaneously pulls on both the first and second ripcords 130, 140 in this fashion, a "crosscut" is achieved such that the first and second ripcords 130, 140 cross each other and both of the ripcords can simultaneously be used to cut through the remaining material of the partial first and second slits 150, 160. This may reduce the force that must be applied when only a single ripcord is used to cut through the remaining material of the tube wall 116 to complete the first and second slits 150, 160.

Figure 8:
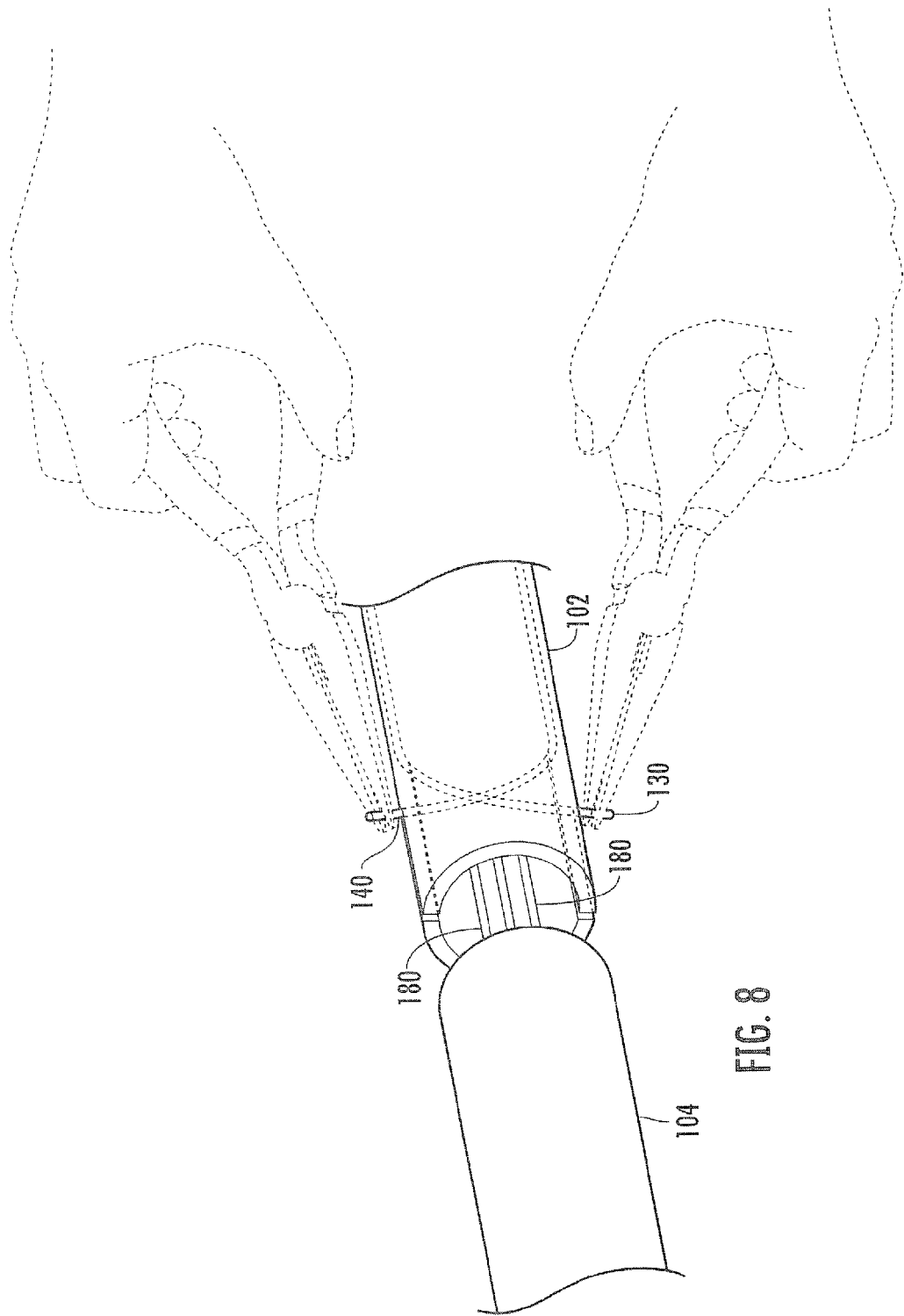
FIG. 8 is a perspective view of the cable conduit of FIG. 7 illustrating how the first ripcord may be used to complete the second longitudinal slit and the second ripcord may be used to complete the first longitudinal slit.

FIG. 8 illustrates a technician performing the operations of blocks 330, 340, 350 and 360. As shown in FIG. 8, after forming the partial first and second slits 150, 160, in blocks 310 and 320, the technician pulls each ripcord out of its respective slit and then crosses the first and second ripcords 130, 140 and aligns them with the opposing partial slit (i.e., the first ripcord 130 is aligned with the second slit 160 and the second ripcord 140 is aligned with first slit 150) and then pulls each ripcord through the opposing slit. In this manner the, first and second ripcords travel through the internal cavity 118 as they are used to tear through the tube wall 116 to complete the first and second slits 150, 160.

Figure 9:
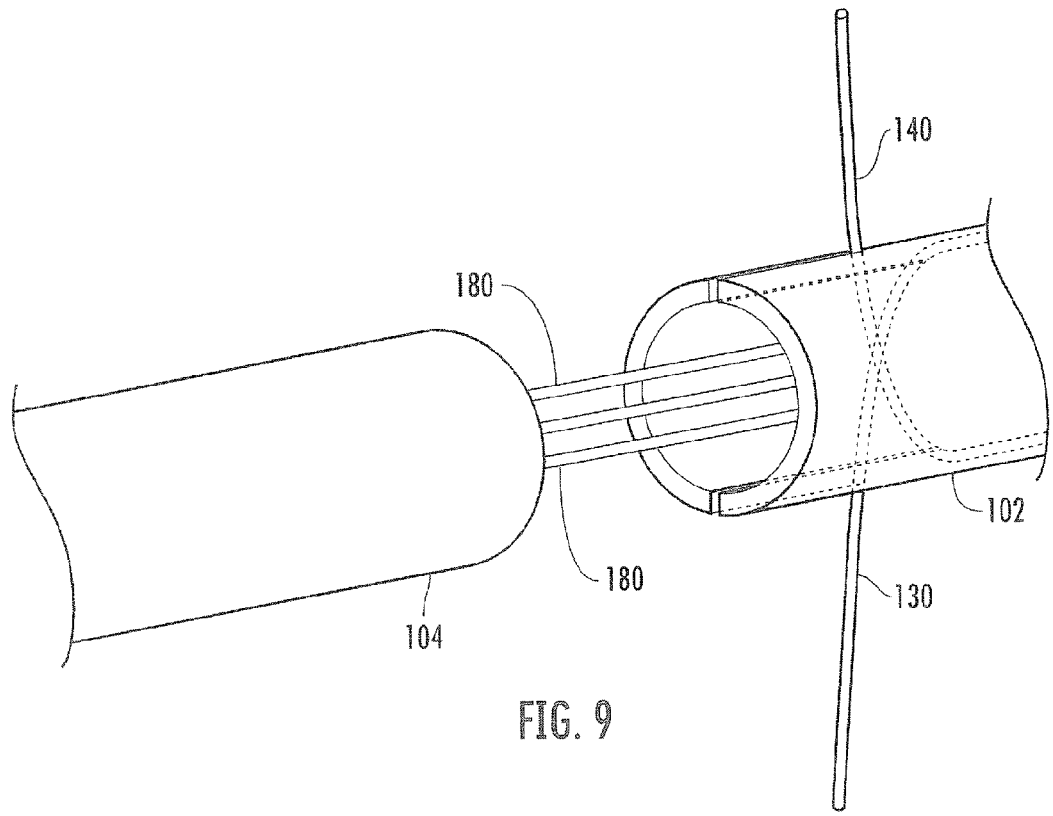
FIG. 9 is a perspective view of the cable conduit of FIG. 8 after a second ring cut has been made in the first longitudinally extending section of the conduit.
Figure 10:
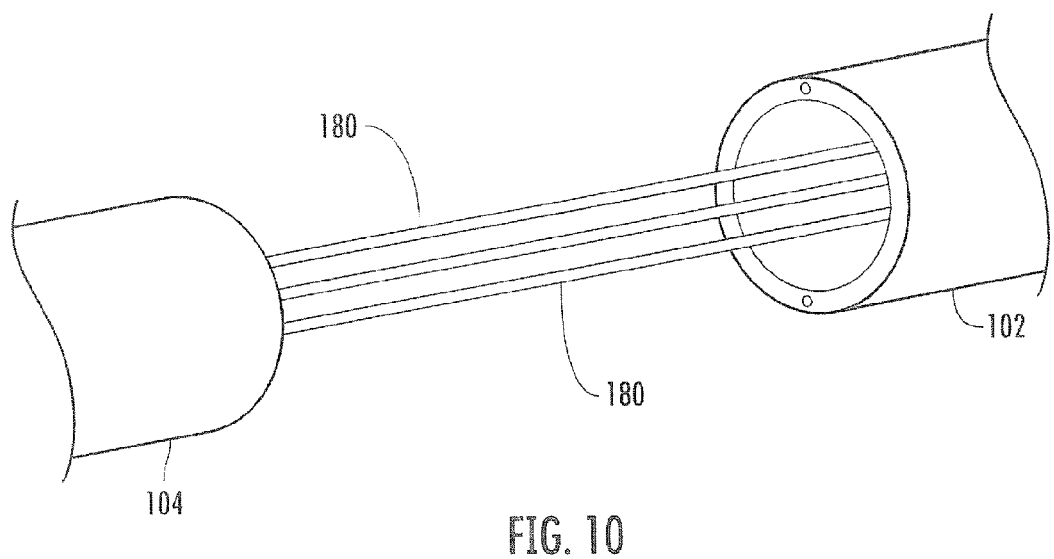
FIG. 10 is a perspective view of the cable conduit of FIG. 9 after the slit portion of the conduit has been removed.

Then, a conduit cutter or other cutting tool may be used to make a second ring cut of the conduit subsection 102 (block 370), at which point the portion of the conduit that was slit can be removed (block 380), providing full access to the desired portion of the cables that are carried in the internal cavity 118 of the conduit. FIG. 9 illustrates the conduit 100 after the operations of block 370 have been performed, and FIG. 10 illustrates the conduit 100 after the operations of block 380 have been performed.

The method of FIG. 4 may thus provide a convenient way to use the ripcords 130, 140 to cut slits 150, 160 all the way through the tube wall 116 without any other cutting operation except for the ring cuts of blocks 310 and 370.

Figure 11:
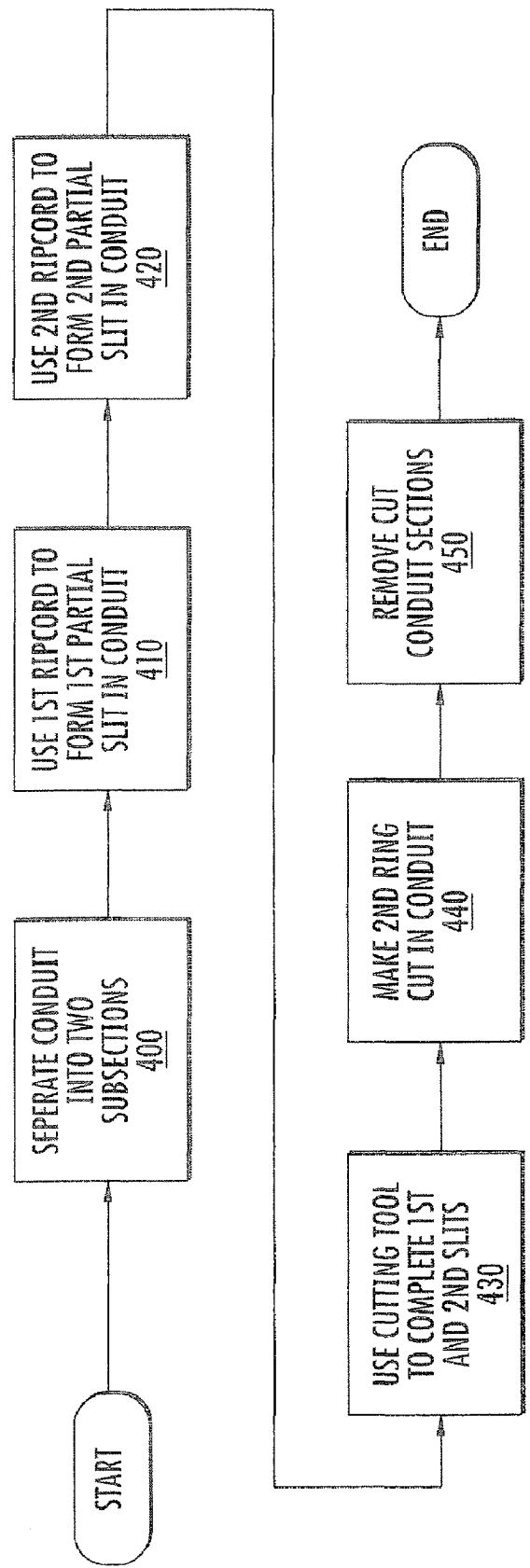
FIG. 11 is a flow chart illustrating methods of slitting a cable conduit according to further embodiments of the present invention.

FIG. 11 is a flow chart illustrating methods of slitting a cable conduit (e.g., the cable conduit 100 of FIGS. 1 and 2) according to further embodiments of the present invention. FIGS. 5 and 10-14 are perspective views of the cable conduit 100 of FIGS. 1 and 2 at selected stages as the conduit 100 is being slit according to the method illustrated in the flow chart of FIG. 11.

As shown in FIG. 11, operations may begin with a technician separating the conduit 100 into first and second longitudinally extending conduit subsections 102, 104 (block 400). As discussed above with respect to block 300 of FIG. 4, this may be accomplished, for example, by using a conduit cutter to make a ring cut through the conduit 100 (and the first and second ripcords 130, 140) without cutting the cables 180 that are carried inside the internal cavity 118 of the conduit 100. FIG. 5 illustrates how the conduit 100 looks after the operations of block 400 are performed.

Figure 12:
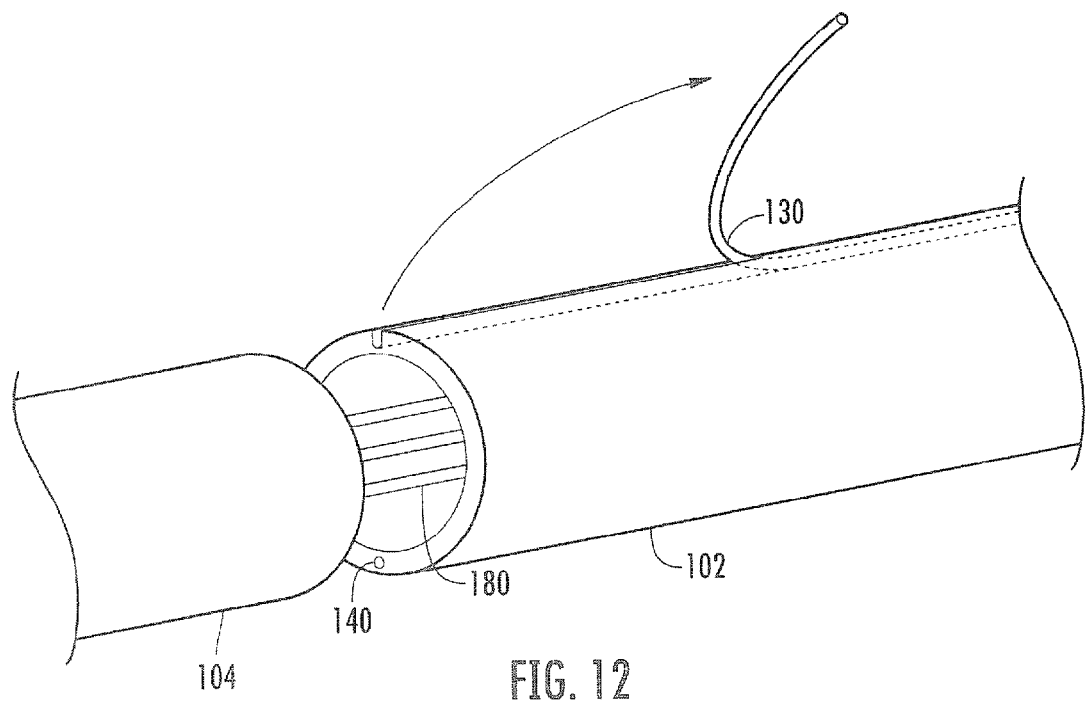
FIG. 12 is a perspective view of a cable conduit after a first ripcord embedded therein has been used to partially form a first longitudinal slit in the first longitudinally extending section.
Figure 13:
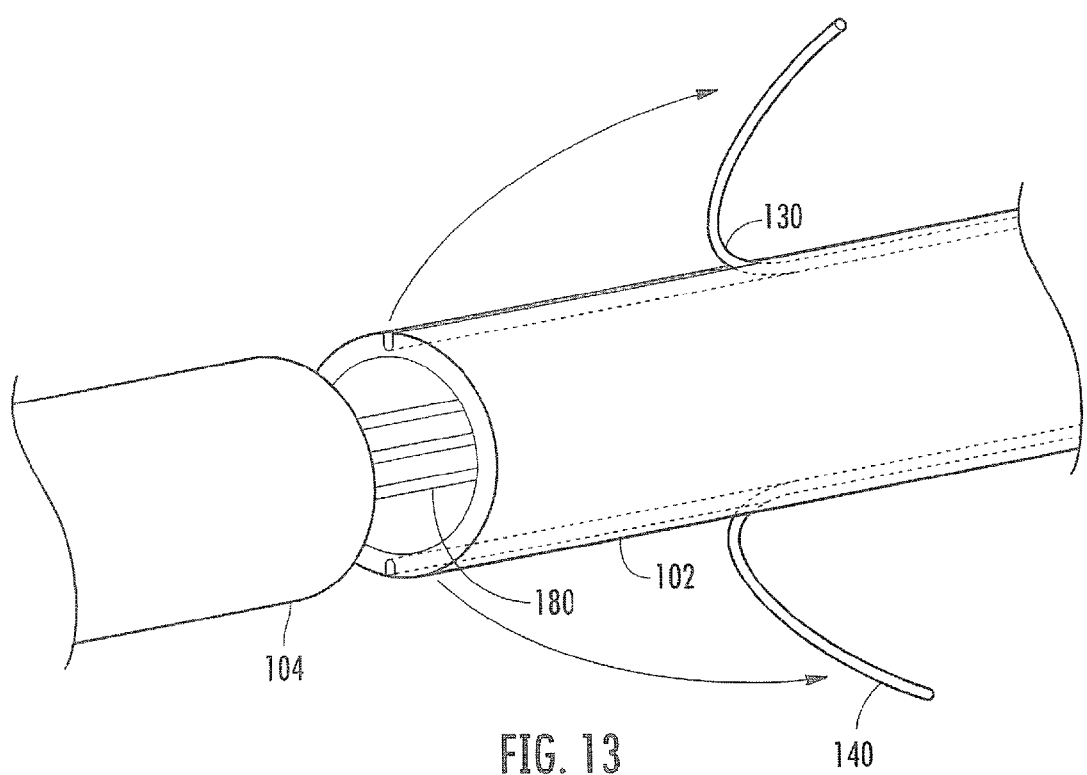
FIG. 13 is a perspective view of the cable conduit of FIG. 12 after a second ripcord embedded therein has been used to partially form a second longitudinal slit in the first longitudinally extending section.

Turning again to FIG. 11, the technician may next grasp the exposed end of the first piece of the first ripcord 130 to pull the exposed end of the first piece of the first ripcord back 130 along the longitudinal length of the first longitudinally extending conduit subsection 102 (block 410). In this manner, the first piece of the first ripcord 130 may be used to partially slit the conduit 100. The first slit 150 may extend for the full length of the portion of the conduit that is to be removed. The operations of block 410 are depicted graphically in FIG. 12. As shown in FIG. 12, as the first ripcord 130 is pulled back along the longitudinal length of the first longitudinally extending conduit subsection 102, it tears a first slit 150 in the conduit 100 that extends from the exterior edge of the first longitudinally extending channel 124 to the exterior surface 112 of the conduit 100. The first slit 150 does not extend all the way through to the internal channel 118, as the first ripcord 130 is not pulled in a direction such that it cuts through the portion of the tube wall 116 between the interior edge of the first longitudinally extending channel 124 and the interior surface 114 of the conduit 100.

Next, the technician can grasp the exposed end of the first piece of the second ripcord 140 and then pull the exposed end of the first piece of the second ripcord 140 back along the longitudinal length of the first longitudinally extending conduit subsection 102 (block 420). In this manner, the first piece of the second ripcord 140 may be used to partially slit the conduit 100. The operations of block 420 are depicted graphically in FIG. 13.

Figure 14:
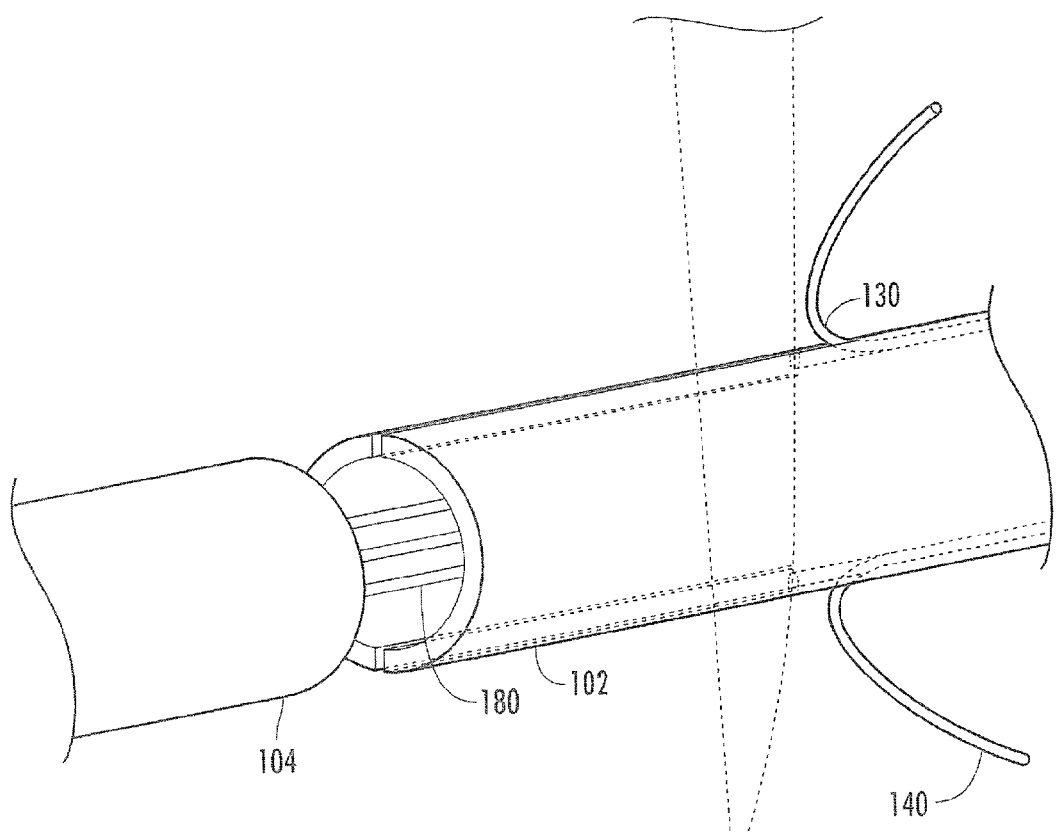
FIG. 14 is a perspective view of the cable conduit of FIG. 12 illustrating how a cutting tool may be used to complete the first and second longitudinal slits.

Next, the technician can use a cutting tool to complete the slits 150, 160 so that each slit extends all the way through the tube wall 116 to expose the internal cavity 118 (block 430). Then, as shown at block 440, a conduit cutter or other cutting tool may be used to make a second ring cut of the conduit, at which point the portion of the conduit that was slit can be removed (block 450), providing full access to the desired portion of the cables 180 that are carried in the internal cavity 118 of the conduit. FIG. 14 illustrates the conduit 100 after the operations of block 440 have been performed, and FIG. 10 illustrates the conduit 100 after the operations of block 450 have been performed.

Figure 15:
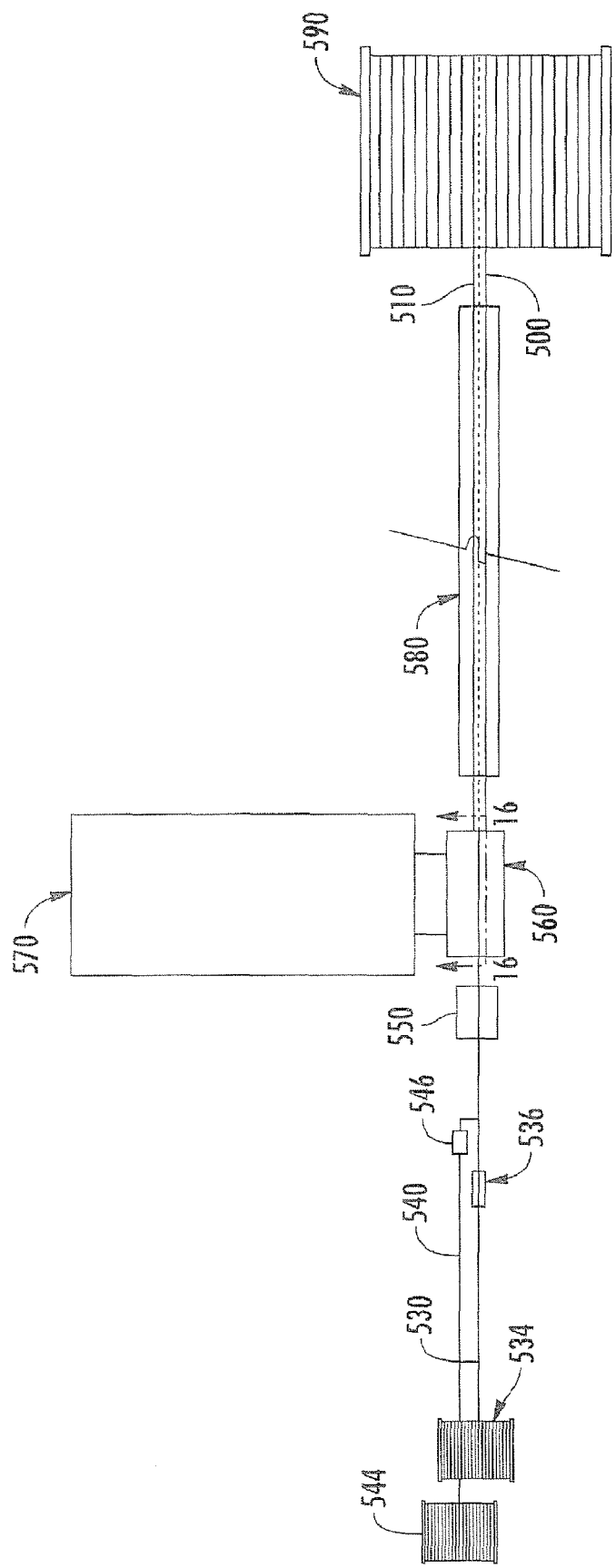
FIG. 15 is a schematic diagram illustrating methods of manufacturing cable conduit according to embodiments of the present invention.

FIG. 15 is a schematic diagram that illustrates a method for producing a cable conduit 500 according to embodiments of the present invention. The conduit 500 may have, for example, the same design as the conduit 100 of FIGS. 1 and 2. As shown in FIG. 15, a first ripcord 530 is taken from a supply reel 534 and is fed through a wire guide 536. A second ripcord 540 is taken from a supply reel 544 and is fed through a wire guide 546. The first and second ripcords 530, 540 are then passed through a lubrication apparatus 550 that lubricates each ripcord 530, 540 for further downstream processing. The lubricated ripcords 530, 540 then advance into a crosshead 560, which communicates with an extruder 570 via a flow channel (not shown). The base material(s) (e.g., high density polyethylene) and any additives such as colorants that are used to form the tubular body 510 of the conduit 500 are fed to the extruder 570 through, for example, a hopper (not shown). The extruder 570 operates at an elevated temperature above the melting temperature of the base materials used to form the elongated tubular body 510 to provide a base material melt. For example, if the conduit is formed of high density polyethylene, the extruder 570 may be operated at a temperature of from about 300 degrees Fahrenheit to about 500 degrees Fahrenheit.

Figure 16:
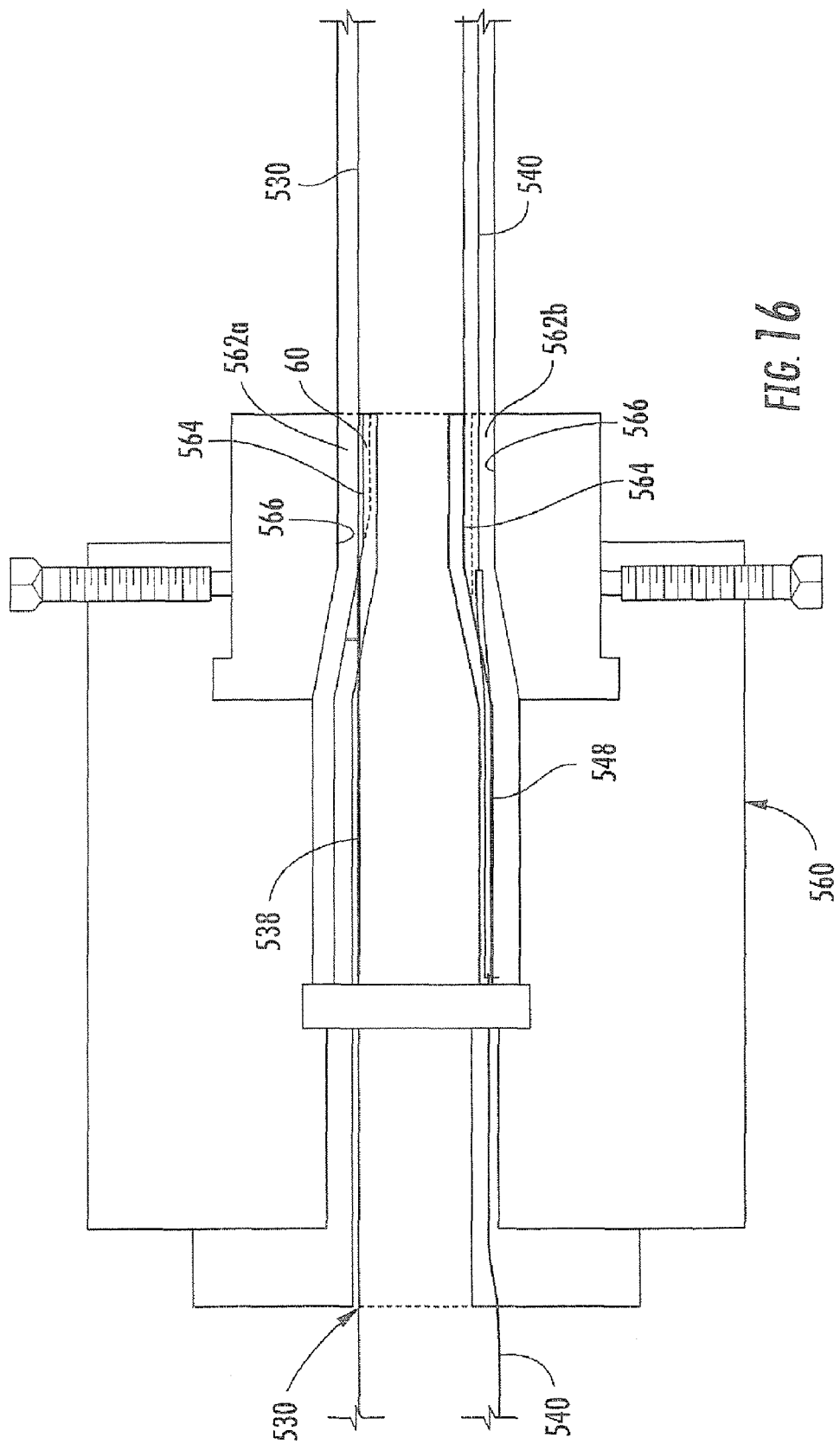
FIG. 16 is a cross-sectional diagram taken along the line 16-16 of FIG. 15 illustrating the interior of a crosshead that may be used to form cable conduit according to embodiments of the present invention.

FIG. 16 illustrates the formation of the conduit 500 in more detail. A first guide tube 538 delivers the first ripcord 530 to a first region 562a of an annular gap 562 between a tip 564 and a die 566 of the crosshead 560, and a second guide tube 548 delivers the second ripcord 540 to a second region 562b of the annular gap 562. At the same time, the extruder 570 delivers the melted conduit base material (e.g., melted high density polyethylene) to both the first and second regions 562a, 562b of the annular gap 562 through a flow channel (not shown). The tip 564 and the die 566 form the annular gap 562 and shape the melted conduit base material into a tubular configuration to form the elongated tubular body 510. The tip 564 provides the shape of the interior surface of the elongated tubular body 510 while the die 566 provides the shape of the exterior surface of the elongated tubular body 510. The melted conduit base material forms around the first and second ripcords 530, 540 so that the ripcords 530, 540 become embedded within the tube wall of the elongated tubular body 510. The coating composition layers on the first and second ripcords 530, 540 and the lubricant that may be applied to the first and second ripcords 530, 540 may reduce and/or prevent any tendency for the first and second ripcords 530, 540 to stick to the melted conduit base material so that the first and second ripcords 530, 540 may freely move within their respective first and second longitudinally extending channels (e.g., the channels 124, 126 that are shown in FIGS. 1 and 2).

If the first and second ripcords 530, 540 are not able to freely move or be "free-floating" within their respective first and second longitudinally extending channels (e.g., the channels 124, 126 that are shown in FIGS. 1 and 2), then problems may occur when the conduit 500 is wound onto a reel, as is typically done during the manufacturing process. Specifically, if the ripcords 530, 540 stick to the tubular body 510 of the conduit 500, when the conduit 500 is wound onto a reel, the outside diameter of the ripcords 530, 540 can crack (due to the longitudinal separation force that is applied to the outside diameter when the conduit is wound) and the inside diameter of the ripcords 530, 540 can buckle (due to the longitudinal compressive force that is applied to the inside diameter when the conduit is wound).

Referring again to FIG. 15, the conduit 100 leaves the crosshead 560 and advances to a cooling trough 580 that utilizes, for example, water to cool the conduit 500 to allow it to harden. The conduit 100 may then advance to a take-up reel 590. The conduit 500 can be stored or shipped on the take-up reel 590 and can readily be installed by unwinding the conduit 500 from the take-up reel 590.

As mentioned above, the ripcords of conduits according to embodiments of the present invention may be used to transmit an electrical signal. As is known to those of skill in the art, a cable conduit can be difficult to locate underground if the conduit is either empty or if it contains only non-metallic cables, such as a fiber optic cables, as metal detecting equipment is ineffective in locating such conduits. As a result, cable conduits are sometimes outfitted with a metallic or magnetic strip or wire that allows the conduit to be detected by metal detecting equipment on the ground surface. Unfortunately, if the cable conduit is buried deep underground (i.e., greater than 5 feet), metal detecting equipment may be unable to locate a cable conduit that includes such a detection strip or wire. Accordingly, it is also known in the art to use toning equipment to transmit a signal along the metallic wire or strip, as the toning signal can typically be detected even if the cable conduit is buried deep underground.

Pursuant to embodiments of the present invention, it will be appreciated that the first or second ripcords (e.g., ripcords 130, 140 of conduit 100) of the cable conduits disclosed herein may be used to carry a toning signal, as these ripcords may comprise metal wires and may run continuously along the length of the conduit body 110. The toning signal that is carried on the first and/or second ripcords 130, 140 may be used to allow the conduit 100 to be detected from the surface by toning equipment when the conduit 100 is buried underground as is discussed, for example, in U.S. Pat. No. 7,361, 835, the contents of which are incorporated by reference herein. Moreover, because of the "skin effect" associated with signal transmission, the toning signal may be transmitted along the outer surface of the ripcords 130, 140, and may thus takes advantage of the high conductivity copper cladding that is provided on certain ripcords according to embodiments of the present invention. Consequently, the ripcord 130, 140 can transmit signals over long distances as desired in the art (e.g. at least 5 miles). Typically, a larger diameter wire (e.g. 18 gauge) transmits a toning signal over longer distances than a smaller diameter wire, and is also stronger than a smaller diameter wire and thus can more effectively act as a ripcord for purposes of ripping the conduit 100 in order to gain access to the cables therein.

Figure 17:
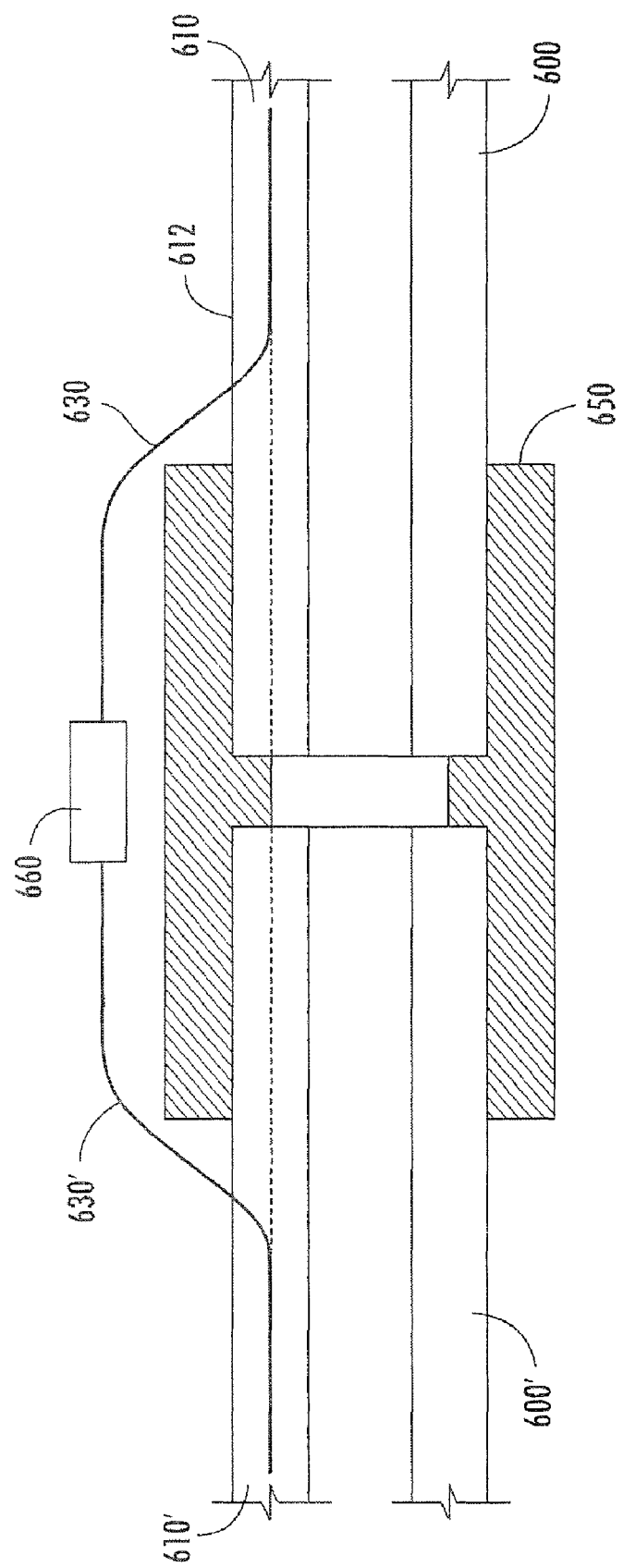
FIG. 17 is a longitudinal section view of two sections of cable conduit coupled together.

In order to transmit such a toning signal over large distances (i.e., as far as 5 miles or more), it may be necessary to connect a ripcord of a first conduit section with the ripcord of another conduit section. Such coupling of the ripcords may be necessary because cable conduits typically range in length from 500 feet (or less) to perhaps as long as 6000 feet for a 1-inch conduit. FIG. 17 illustrates how cable conduits according to embodiments of the present invention may be coupled together in a manner that allows transmission of a toning signal over multiple conduit segments.

In particular, as shown in FIG. 17, an end portion of a ripcord 630 of a first conduit 600 can be torn out through an exterior surface 612 of the elongated tubular body 610 of the conduit (using, for example, pliers), as is shown in FIG. 17. Likewise, a ripcord 630' may be torn out of a second conduit 600' in a similar fashion. As shown in FIG. 17, the first conduit 600 may be coupled to the second conduit 600' using, for example, a conduit connector 650 that is fitted onto the first conduit 600 and the second conduit 600' to provide a connection between adjacent segments of conduit. The exposed end portion of the ripcords 630 and 630' that are torn out of the first conduit 600 and the second conduit 600', respectively, may be electrically connected or coupled together through the use of a suitable device such as the electrical connector 660.

Figure 20:
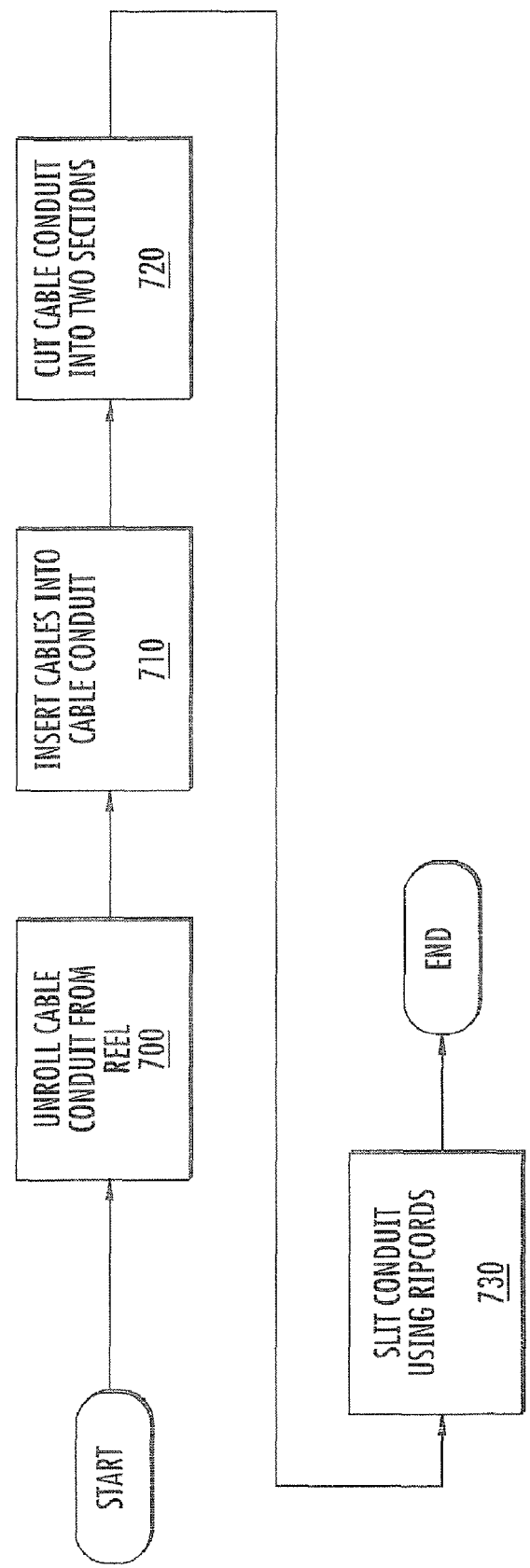
FIG. 20 is a flow chart illustrating methods of installing a plurality of cables in a cable conduit according to embodiments of the present invention.

Pursuant to further embodiments of the present invention, methods of accessing a plurality of cables in a cable conduit are provided. FIG. 20 is a flow chart illustrating certain of these methods.

As shown in FIG. 20, operations may start with a cable conduit according to embodiments of the present invention being unrolled from a reel (block 700). The cable conduit may comprise any of the above-described cable conduits according to embodiments of the present invention. By way of example, the cable conduit may comprise the cable conduit 100 that is described above, and may include a high density polyethylene elongated tubular conduit body having an exterior surface and an interior surface that define a tube wall, a longitudinal internal cavity that is configured to hold a plurality of jacketed cables, first and second longitudinally extending channels within the tube wall that are located on opposite sides of the longitudinal internal cavity, and first and second ripcords that are free-floating within at least a portion of the respective first and second longitudinally extending channels. The reel may be, for example, a reel on which the cable conduit is wound at the time of manufacture.

In some embodiments, the plurality for cables may be pre-installed within the internal cavity of the conduit at for example, the factory. As shown in block 710 of FIG. 20, in other embodiments, each of the plurality of cables may be inserted into the internal cavity of the cable conduit in the field so that each of the cables extends through the internal cavity of the cable conduit. If the cable conduit is to be installed underground, the plurality of cables may be inserted into the cable conduit either before or after the conduit is placed in an underground trench. In any event, once the cables have been inserted into the cable conduit, the elongated conduit body and the first and second ripcords of the cable conduit may be cut to divide the cable conduit into two sections (block 720). This may be accomplished, for example, by using a conduit cutter to ring cut the conduit.

The first and second ripcords may then be used to slit one of the conduit sections (block 730). In particular, the first ripcord may be used to make a first slit in the cable conduit adjacent the ring cut and the second ripcord may be used to make a second slit in the cable conduit adjacent the ring cut. Any of the methods of slitting cable conduit according to embodiments of the present invention may be used to make these slits in the cable conduit, including the crossover technique discussed above. The amount of conduit that is slit may vary depending upon the particular application. In exemplary applications, as little as one foot or as much as fifty feet or more of the conduit may be slit. Once the slits are completed, the internal cavity of the cable conduit is exposed, thereby providing access to the plurality of cables contained therein. As discussed above, a second ring cut may be made so that the slit portions of the conduit may be removed completely.

The conduits according to embodiments of the present invention can include one or more cables such as coaxial cables, fiber optic cables, twisted pair cables, electrical cables, support or messenger cables, and the like. Some of the cables that are carried by the conduit may themselves have a ripcord for removing a jacket or outer layer thereof.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A method of longitudinally slitting a cable conduit that includes an elongated tubular conduit body having an exterior surface and an interior surface that define a tube wall, a longitudinal internal cavity that is defined by the interior surface of the tubular conduit body, a first ripcord that is free-floating within a first longitudinally extending closed channel in the tube wall and a second ripcord that is free-floating within a second longitudinally extending closed channel in the tube wall, the method comprising:

cutting through the conduit body and the first ripcord and the second ripcord to separate each of the conduit body, the first ripcord and the second ripcord into respective first and second subsections;

grasping an end portion of the first subsection of the first ripcord;

pulling the end portion of the first subsection of the first ripcord back along a portion of the length of the first conduit body subsection to form a first longitudinal slit in the first conduit body subsection;

grasping an end portion of the first subsection of the second ripcord; and pulling the end portion of the first subsection of the second ripcord back along a portion of the length of the first conduit body subsection to form a second longitudinal slit in the first conduit body subsection, wherein the tubular conduit body includes a plurality of individually jacketed cables therein, and wherein the first and second ripcords are not exposed to the longitudinal internal cavity.

2. The method of claim 1, wherein the first and second slits are each partial slits that do not extend all the way through the cylindrical body to expose the longitudinal extending internal cavity.

3. The method of claim 1, wherein the first longitudinal slit does not extend all the way through the tube wall to expose the longitudinal internal cavity, and wherein the method further comprises using a cutting blade to deepen the first slit to extend all the way through the conduit body to expose the longitudinally internal cavity.

4. The method of claim 1, wherein the first and second ripcords are each coated with a coating that prevents the first and second ripcords from adhering to the elongated tubular conduit body.

5. The method of claim 1, wherein the first and second ripcords comprise conductive ripcords, the method further comprising transmitting a toning signal along at least one of the first ripcord or the second ripcord prior to cutting through the conduit body.

6. The method of claim 1, wherein the interior surface of the elongated tubular body separates the first and second ripcords from the longitudinal internal cavity that is defined by the interior surface of the tubular conduit body so that the first and second ripcords are not exposed to the longitudinal internal cavity.

7. The method of claim 1, wherein the first and second ripcords are only partly embedded within the tubular conduit body and a thin web of material separates the first and second ripcords from the longitudinal internal cavity that is defined by the interior surface of the tubular conduit body so that the first and second ripcords are not exposed to the longitudinal internal cavity.

8. The method of claim 1, wherein the first and second ripcords comprise conductive ripcords.

9. The method of claim 8, further comprising transmitting a toning signal along at least one of the first ripcord or the second ripcord prior to cutting through the conduit body.

10. A method of longitudinally slitting a cable conduit that includes an elongated tubular conduit body having an exterior surface and an interior surface that define a tube wall, a first ripcord that is free-floating within a first longitudinally extending channel in the tube wall, a second ripcord that is free-floating within a second longitudinally extending channel in the tube wall and a longitudinal internal cavity that is defined by the interior surface of the tubular conduit body, the method comprising:

cutting through the conduit body and the first ripcord and the second ripcord to separate each of the conduit body, the first ripcord and the second ripcord into respective first and second subsections;

grasping an end portion of the first subsection of the first ripcord;

pulling the end portion of the first subsection of the first ripcord back along a portion of the length of the first conduit body subsection to form a first longitudinal slit in the first conduit body subsection;

grasping an end portion of the first subsection of the second ripcord; and pulling the end portion of the first subsection of the second ripcord back along a portion of the length of the first conduit body subsection to form a second longitudinal slit in the first conduit body subsection inserting the first subsection of the first ripcord into the second longitudinal slit; and pulling the first subsection of the first ripcord back along a portion of the length of the first conduit body subsection so that the first subsection of the first ripcord extends the length of the second longitudinal slit, wherein the first conduit body subsection comprises a cylindrical body having a longitudinally extending internal cavity, and wherein the first longitudinal slit and the second longitudinal slit are spaced apart on the cylindrical body by approximately 180 degrees wherein the first and second slits are each partial slits that do not extend all the way through the cylindrical body to expose the longitudinally extending internal cavity.

11. The method of claim 10, the method further comprising:

inserting the first subsection of the second ripcord into the first longitudinal slit; and pulling the first subsection of the second ripcord back along a portion of the length of the first conduit body subsection so that the first subsection of the second ripcord extends the length of the first longitudinal slit.

12. The method of claim 11, wherein the first subsection of the first ripcord is pulled back along a portion of the length of the first conduit body subsection so that the first subsection of the first ripcord extends the length of the second longitudinal slit at the same time that the first subsection of the second ripcord is pulled back along a portion of the length of the first conduit body subsection so that the first subsection of the second ripcord extends the length of the first longitudinal slit.

13. The method of claim 10, further comprising cutting through the first conduit body subsection and the first subsection of the first ripcord and the first subsection of the second ripcord, and then removing a portion of the first conduit body subsection that is between the location of the cut and the second conduit body subsection.

14. A method of longitudinally slitting a cable conduit that includes an elongated tubular conduit body having an exterior surface and an interior surface that define a tube wall, a first ripcord that is free-floating within a first longitudinally extending channel in the tube wall, a second ripcord that is free-floating within a second longitudinally extending channel in the tube wall and a longitudinal internal cavity that is defined by the interior surface of the tubular conduit body, the method comprising:

cutting through the conduit body and the first ripcord and the second ripcord to separate each of the conduit body, the first ripcord and the second ripcord into respective first and second subsections;

grasping an end portion of the first subsection of the first ripcord;

pulling the end portion of the first subsection of the first ripcord back along a portion of the length of the first conduit body subsection to form a first longitudinal slit in the first conduit body subsection;

grasping an end portion of the first subsection of the second ripcord; and pulling the end portion of the first subsection of the second ripcord back along a portion of the length of the first conduit body subsection to form a second longitudinal slit in the first conduit body subsection, wherein the first and second ripcords are each coated with a coating that prevents the first and second ripcords from adhering to the elongated tubular conduit body, and wherein the first and second slits do not expose the longitudinally extending internal cavity.

15. The method of claim 14, wherein the tubular conduit body includes a plurality of individually jacketed cables therein that do not have a fixed relationship with respect to the elongated tubular conduit body.

16. The method of claim 14, wherein the interior surface of the elongated tubular conduit body is a smooth surface.

17. The method of claim 14, wherein the first and second slits are each partial slits that do not extend all the way through the cylindrical body to expose the longitudinally extending internal cavity.

18. The method of claim 14, wherein the first and second ripcords each have an elongation of at least about 3%.

19. The method of claim 14, wherein the first and second ripcords are located adjacent an exterior surface of the elongated tubular conduit body.

20. The method of claim 14, wherein the first and second ripcords comprise conductive ripcords, the method further comprising transmitting a toning signal along at least one of the first ripcord or the second ripcord prior to cutting through the conduit body.

* * * * *

UNITED STATES PATENT AND TRADEMARK OFFICE
CERTIFICATE OF CORRECTION

PATENT NO. : 8,280,209 B2
APPLICATION NO. : 12/549527
DATED : October 2, 2012
INVENTOR(S) : Bollinger, Jr. et al.

It is certified that error appears in the above-identified patent and that said Letters Patent is hereby corrected as shown below:

On Title Page:
Item (73), Assignee:
Please replace "CommScope, Inc., Hickory, NC (US)"
to read -- CommScope, Inc. of North Carolina, Hickory, NC (US) --

Signed and Sealed this
Seventeenth Day of September, 2013

Teresa Stanek Rea
*Deputy Director of the United States Patent and Trademark Office*